US 12,058,591 B2

(12) United States Patent
Bhardwaj et al.

(10) Patent No.: US 12,058,591 B2
(45) Date of Patent: Aug. 6, 2024

(54) AUTOMATED WIRELESS CONNECTION FOR OPERATING SYSTEM PROJECTION IN VEHICLES

(71) Applicant: Google LLC, Mountain View, CA (US)

(72) Inventors: Rishabh Bhardwaj, Munich (DE); Luca Scalia, Munich (DE); Bernd Holzhey, Neubiberg (DE)

(73) Assignee: Google LLC, Mountain View, CA (US)

(*) Notice: Subject to any disclaimer, the term of this patent is extended or adjusted under 35 U.S.C. 154(b) by 140 days.

(21) Appl. No.: 17/452,848

(22) Filed: Oct. 29, 2021

(65) Prior Publication Data
US 2023/0138858 A1 May 4, 2023

(51) Int. Cl.
| | | |
|---|---|---|
| H04W 4/40 | (2018.01) | |
| H04W 12/06 | (2021.01) | |
| H04W 48/18 | (2009.01) | |
| H04W 88/04 | (2009.01) | |
| H04W 88/06 | (2009.01) | |

(52) U.S. Cl.
CPC ............ *H04W 4/40* (2018.02); *H04W 12/06* (2013.01); *H04W 48/18* (2013.01); *H04W 88/04* (2013.01); *H04W 88/06* (2013.01)

(58) Field of Classification Search
CPC ....... H04W 4/40; H04W 12/06; H04W 48/18; H04W 88/04; H04W 88/06; H04W 4/48; H04L 67/12; H04L 67/141; H04L 69/24; H04L 67/08
USPC ...................................................... 370/329
See application file for complete search history.

(56) References Cited

U.S. PATENT DOCUMENTS

| 10,736,159 B2 | 8/2020 | Kim |
| 2013/0106750 A1 | 5/2013 | Kurosawa |
| 2014/0120829 A1 | 5/2014 | Bhamidipati et al. |
| 2014/0187149 A1 | 7/2014 | Lortz et al. |
| 2014/0229627 A1 | 8/2014 | Maeng et al. |
| 2015/0026312 A1 | 1/2015 | Othmer et al. |

(Continued)

FOREIGN PATENT DOCUMENTS

| EP | 2615869 A1 | 7/2013 |
| EP | 3038397 A1 | 6/2016 |

(Continued)

OTHER PUBLICATIONS

Extended Search Report from counterpart European Application No. 22197214.4 dated Mar. 20, 2023, 10 pp.

(Continued)

*Primary Examiner* — Huy C Ho (74) *Attorney, Agent, or Firm* — Shumaker & Sieffert, P.A.

(57) ABSTRACT

A computing device may perform various aspects of the techniques described in this disclosure, and comprises a processor, a network interface, and a memory. The processor may receive, from a vehicle head unit, and via a wireless inter-device communication process, connection information identifying a wireless network provided by the vehicle head unit. The network interface may automatically establish, based on the connection information, a wireless network connection to the wireless network provided by the (Continued)

vehicle head unit. The processor may project, via the wireless network connection, a vehicle operating system to the vehicle head unit for display by the vehicle head unit. The memory may store the connection information.

20 Claims, 3 Drawing Sheets

(56) References Cited

U.S. PATENT DOCUMENTS

| | | | |
|---|---|---|---|
| 2016/0134996 A1 | 5/2016 | Verma et al. | |
| 2016/0154643 A1 | 6/2016 | Zhang et al. | |
| 2016/0173548 A1 | 6/2016 | Yang | |
| 2019/0215882 A1* | 7/2019 | Kim | G06K 7/1417 |
| 2021/0029236 A1 | 1/2021 | Yoshiura | |
| 2021/0392054 A1* | 12/2021 | David | G06K 7/10297 |

FOREIGN PATENT DOCUMENTS

| | | |
|---|---|---|
| GB | 2516377 A | 1/2015 |
| JP | 2015097314 A | 5/2015 |
| JP | 2015104098 A | 6/2015 |
| JP | 2016513391 A | 5/2016 |
| JP | 2016105080 A | 6/2016 |
| JP | 2017512037 A | 4/2017 |
| JP | 2019186671 A | 10/2019 |
| KR | 20190084475 A | 7/2019 |
| WO | 2013039760 A1 | 3/2013 |
| WO | 2016127138 A1 | 8/2016 |
| WO | 2021082406 A1 | 5/2021 |

OTHER PUBLICATIONS

Mercedes me connect | Mercedes-Benz USA, Retrieved from https://www.mbusa.com/en/mercedes-me-connect on Jul. 21, 2021, 13 pgs.

YouTube, Using Easy In-Car Login via My BMW App—BMW How-To, Published Apr. 7, 2021, https://www.youtube.com/watch?v=5V8GCnZklho, 1 pg.

First Examination Report from counterpart Indian Application No. 202244053095 dated Aug. 4, 2023, 7 pp.

Response to Office Action dated Aug. 4, 2023, from counterpart Indian Application No. 202244053095 filed Feb. 2, 2024, 10 pp.

Response to Office Action dated Nov. 14, 2023, from counterpart Japanese Application No. 2022-169210 filed Jan. 31, 2024, 7 pp.

Response to Extended Search Report dated Mar. 20, 2023, from counterpart European Application No. 22197214.4 filed Nov. 1, 2023, 24 pp.

Office Action, and translation thereof, from counterpart Japanese Application No. 2022-169210 dated Nov. 14, 2023, 8 pp.

Notification of Reason for Refusal, and translation thereof, from counterpart Japanese Application No. 2022-169210 dated Apr. 2, 2024, 8 pp.

Office Action, and translation thereof, from counterpart Korean Application No. 10-2022-0135093 dated Mar. 18, 2024, 15 pp.

* cited by examiner

AUTOMATED WIRELESS CONNECTION FOR OPERATING SYSTEM PROJECTION IN VEHICLES

BACKGROUND

Vehicles may provide wireless networks for a number of different reasons. In some instances, the wireless network provided by vehicles may enable occupant devices, such as a smartphone, a smartwatch, smart glasses, a tablet computer, a laptop computer, a portable gaming system, etc., to interface with a vehicle head unit included within the vehicle. The occupant device may, as an example, interface with the vehicle head unit via the wireless network to project an operating system to the vehicle head unit, which the vehicle head unit may present by way of a display communicatively coupled to the vehicle head unit.

In order to project the operating system, the occupant of a vehicle may interface with the device to initiate a personal area network (PAN) connection between the device and the vehicle head unit. The device first establishes the PAN connection to negotiate credentials between the device and the vehicle head unit. After negotiating credentials via the PAN connection, the device may establish a connection with the wireless network (which is different than the PAN) and begin projecting the operating system to the vehicle head unit via the wireless network connection.

SUMMARY

In general, various aspects of the techniques set forth in this disclosure are directed to automated wireless connection for operating system projection in vehicles. Rather than establish a PAN connection that may be prone to connection issues, user error, signal degradation, incompatible PAN implementations, etc., various aspects of the techniques enable a vehicle head unit to perform a wireless inter-device communication process to provide connection information identifying a wireless network hosted by the vehicle head unit. The wireless inter-device communication process may include presentation of a quick response (QR) code that provides the connection information, allowing an occupant device to capture an image of the QR code and thereby automatically establish a wireless network connection with the vehicle head unit via the wireless network hosted by the vehicle head unit. After establishing the wireless network connection, the occupant device may then project an operating system to the vehicle head unit for display by the vehicle head unit.

As such, various aspects of the techniques may enable the occupant device to automatically establish a wireless network connection with the vehicle head unit for purposes of projecting the operating system without having to resort to complicated pairing processes involved in establishing the PAN connection. That is, establishing the PAN connection may involve multiple different steps that are susceptible to user error and/or frustration, connection issues (due to, as one example, interference), faulty or incompatible implementations, and the like that may significantly detract from the user experience involved in wireless projection of operating systems.

Moreover, repeated attempts to establish the PAN connection may consume significant computing resources of the occupant device, such as processor cycles, memory storage space, memory bus bandwidth, and/or power associated with operating the processor, memory, memory bus, and wireless radios. By avoiding or refraining from establishing the PAN connection in favor of a more straightforward QR code to establish the potentially better, more established wireless network connection (e.g., an Institute of Electrical and Electronics Engineers—IEEE-802.11 compliant wireless local area network standard), operation of the occupant device may itself improve through more efficient operation.

In an example, aspects of the techniques are directed to a method comprising: receiving, by a computing device, from a vehicle head unit, and via a wireless inter-device communication process, connection information identifying a wireless network provided by the vehicle head unit; automatically establishing, by the computing device, and based on the connection information, a wireless network connection to the wireless network provided by the vehicle head unit; and projecting, by the computing device, and via the wireless network connection, a vehicle operating system to the vehicle head unit for display by the vehicle head unit.

In another example, aspects of the techniques are directed to a computing device comprising: one or more processors configured to receive, from a vehicle head unit, and via a wireless inter-device communication process, connection information identifying a wireless network provided by the vehicle head unit; a network interface configured to automatically establish, based on the connection information, a wireless network connection to the wireless network provided by the vehicle head unit, wherein the one or more processors are configured to project, via the wireless network connection, a vehicle operating system to the vehicle head unit for display by the vehicle head unit; and a memory configured to store the connection information.

In another example, aspects of the techniques are directed to a non-transitory computer-readable storage medium having instructions stored thereon that, when executed, cause one or more processors to: receive, from a vehicle head unit, and via a wireless inter-device communication process, connection information identifying a wireless network provided by the vehicle head unit; automatically establish, based on the connection information, a wireless network connection to the wireless network provided by the vehicle head unit; and project, via the wireless network connection, a vehicle operating system to the vehicle head unit for display by the vehicle head unit.

In another example, aspects of the techniques are directed to an apparatus comprising: means for receiving, by a computing device, from a vehicle head unit, and via a wireless inter-device communication process, connection information identifying a wireless network provided by the vehicle head unit; means for automatically establishing, by the computing device, and based on the connection information, a wireless network connection to the wireless network provided by the vehicle head unit; and means for projecting, by the computing device, and via the wireless network connection, a vehicle operating system to the vehicle head unit for display by the vehicle head unit.

The details of one or more examples are set forth in the accompanying drawings and the description below. Other features, objects, and advantages of the disclosure will be apparent from the description and drawings, and from the claims.

DETAILED DESCRIPTION

Figure 1:
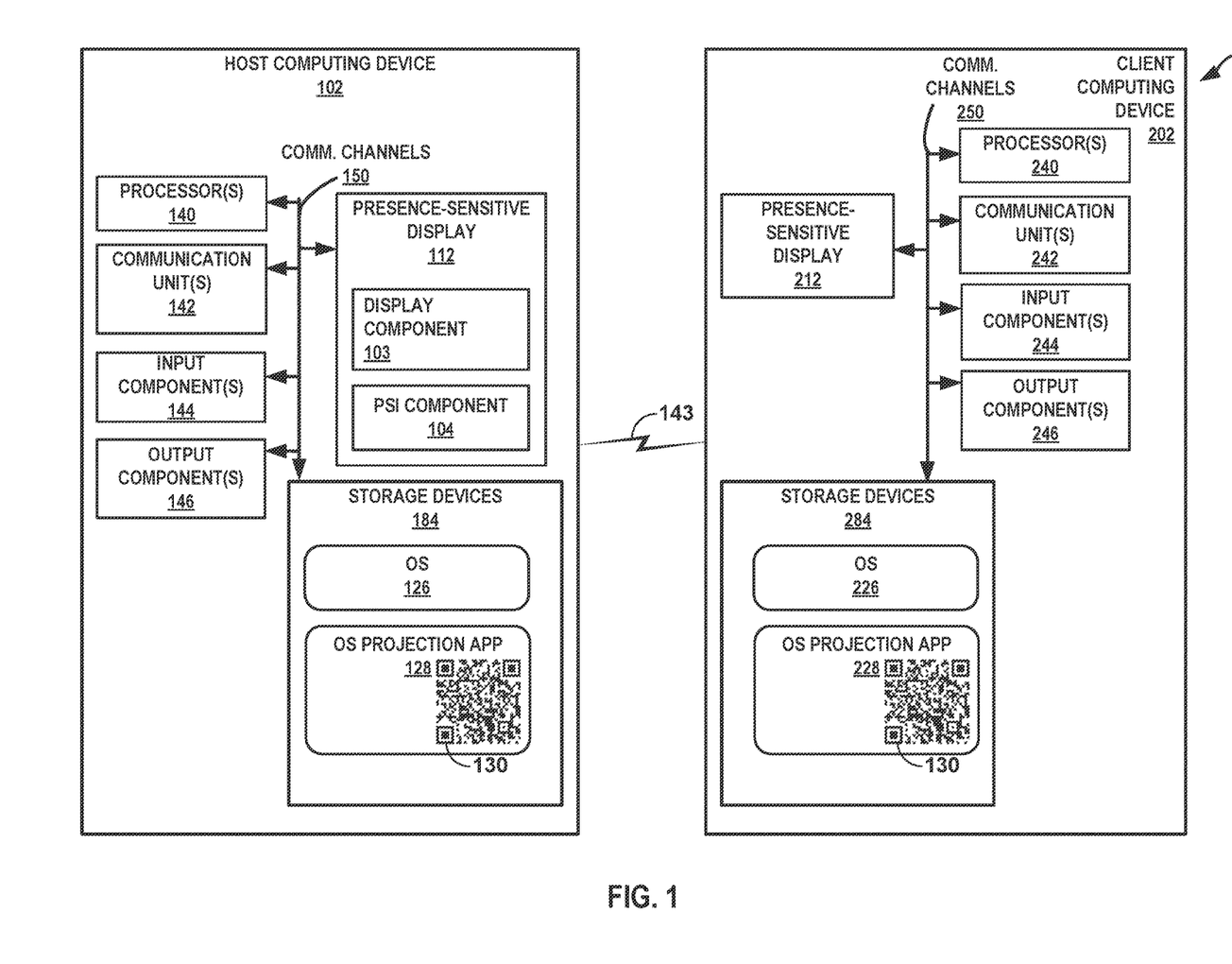
FIG. 1 is a block diagram illustrating an example computing system that is configured to provide user account aware personal area network bonding in accordance with various aspects of the techniques described in this disclosure.

FIG. 1 is a block diagram illustrating an example computing system that is configured to provide user account aware personal area network bonding in accordance with various aspects of the techniques described in this disclosure. As shown in the example of FIG. 1, a computing system 100 includes a host computing device 102 and a client computing device 202. Although described with respect to a vehicle, the computing system 100 may be utilized in different contexts, including standalone computing systems (including laptop computers, desktop computers, workstations and the like), gaming systems, cellular telephones (including so-called "smartphones"), media systems (including streaming media systems), audio/visual (A/V) receivers, televisions (including so-called "smart televisions"), smart speakers, smart watches, thermostats (including so-called "smart thermostats"), smart glasses, or any other computing system.

In any event, host computing device 102 is an example of vehicle computing device, such as head unit or other vehicular computing system (such as an electronic control unit—ECU). FIG. 1 illustrates only one particular example of host computing device 102, and many other examples of host computing device 102 may be used in other instances and may include a subset of the components included in example computing device 102 or may include additional components not shown in the example of FIG. 1.

As shown in the example of FIG. 1, host computing device 102 includes presence-sensitive display 112, one or more processors 140, one or more communication units 142, one or more input components 144, one or more output components 146, and one or more storage devices 148. Storage devices 148 of host computing device 102 may store (or otherwise, include) software modules, such as an operating system (OS) 126 and an OS projection application ("OS projection app") 128.

Communication channels 150 may interconnect each of the components 112, 140, 142, 146, and/or 148 for inter-component communications (physically, communicatively, and/or operatively) and thereby allow components 112, 140, 142, 146, and 148 to communicate with one another. In some examples, communication channels 150 may include a system bus, a network connection, one or more inter-process communication data structures, or any other components for communicating data (also referred to as information). Although shown as including components 112, 140, 142, 146, and 148, host computing device 102 may include other components or less components than those shown, where such components may be included in other control units such as a telematic control unit (TCU).

One or more communication units 142 of host computing device 102 may communicate with external devices by transmitting and/or receiving data. For example, host computing device 102 may use one or more of communication units 142 to transmit and/or receive radio signals on a radio network such as a cellular radio network. In some examples, communication units 142 may transmit and/or receive satellite signals on a satellite network such as a Global Positioning System (GPS) network. Examples of communication units 142 include a network interface card (e.g., an Ethernet card), an optical transceiver, a radio frequency transceiver, a GPS receiver, or any other type of device that can send and/or receive information. Other examples of communication units 142 may include short wave radios (e.g., near field communication (NFC), personal area networks—such as Bluetooth® and different profiles thereof, e.g., Bluetooth® low energy (BLE), etc.), GPS, 3G, 4G, 5G, and wireless local area network (WLAN) radios (where such WLAN radios may conform to an Institute of Electrical and Electronics—IEEE 802.11 standards, which may also be referred to as WiFi® standards) found in mobile devices as well as Universal Serial Bus (USB) controllers and the like. In the example of FIG. 1, communication units 142 are assumed to implement both a personal area network (PAN) interface and a WLAN interface by which wireless local area network connections may be established with another computing device (e.g., client computing device 202).

One or more input components 144 of host computing device 102 may receive input. Examples of input are tactile, audio, kinetic, and optical input, to name only a few examples. Input components 144 of host computing device 102 include, in one example, a mouse, keyboard, touchpad, voice responsive system, video camera, buttons, scroll wheel, dial, control pad, microphone or any other type of device for detecting input from a human or machine. Input components 144 may include cameras. In some examples, input component 144 may be a presence-sensitive input component, which may include a presence-sensitive screen, touch-sensitive screen, etc. separate from presence-sensitive display 112.

One or more output components 146 of host computing device 102 may generate output. Examples of output are tactile, audio, and video output. Output components 146 of host computing device 102, in some examples, include a presence-sensitive screen (possibly separate from presence-sensitive display 112), sound card, video graphics adapter card, speaker, cathode ray tube (CRT) monitor, liquid crystal display (LCD), organic light emitting diode (OLED), or any other type of device for generating tactile, audio and/or visual output to a human or machine.

In some examples, presence-sensitive display 112 of host computing device 102 may include functionality of input component 144 and/or output components 146. In the example of FIG. 1, presence-sensitive display 112 may include a presence-sensitive input (PSI) component 104 ("PSI component 104"), such as a presence-sensitive screen or touch-sensitive screen. In some examples, presence-sensitive input component 104 may detect an object at and/or near the presence-sensitive input component. As one example range, presence-sensitive input component 104 may detect an object, such as a finger or stylus that is within two inches or less of presence-sensitive input component 104. Presence-sensitive input component 104 may determine a location (e.g., an (x,y) coordinate) of the presence-sensitive input component at which the object was detected. In another example range, presence-sensitive input component 104 may detect an object two inches or less from presence-sensitive input component 104 and other ranges are also possible. Presence-sensitive input component 104 may determine the location of presence-sensitive input component 104 selected by a user's finger using capacitive, inductive, and/or optical recognition techniques.

In some examples, presence-sensitive display 112 may also provide output to a user using tactile, audio, or video stimuli as described with respect to output component 146. For instance, presence-sensitive display 112 may include display component 103 that displays a graphical user interface. Display component 103 may be any type of output component that provides visual output, such as described with respect to output components 146. While illustrated as an integrated component of host computing device 102, presence-sensitive display 112 may, in some examples, be an external component that shares a data or information path with other components of host computing device 102 for transmitting and/or receiving input and output.

For instance, presence-sensitive display 112 may be a built-in component of host computing device 102 located within and physically connected to the external packaging of host computing device 102 (e.g., an in-vehicle screen mounted in a dashboard of a vehicle). In another example, presence-sensitive display 112 may be an external component of host computing device 102 located outside and physically separated from the packaging of host computing device 102 (e.g., a monitor, a projector, etc. that shares a wired and/or wireless data path with an electronic control unit of the vehicle). In some examples, presence-sensitive display 112, when located outside of and physically separated from the packaging of host computing device 102, may be implemented by two separate components: a presence-sensitive input component 104 for receiving input and a display component 103 for providing output.

One or more storage components 148 within host computing device 102 may store information for processing during operation of host computing device 102 (e.g., computing device 102 may store data accessed by modules 126-136 during execution at host computing device 102). In some examples, storage component 148 is a temporary memory, meaning that a primary purpose of storage component 148 is not long-term storage. Storage components 148 on host computing device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 148, in some examples, also include one or more computer-readable storage media. Storage components 148 in some examples include one or more non-transitory computer-readable storage mediums. Storage components 148 may be configured to store larger amounts of information than typically stored by volatile memory. Storage components 148 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 148 may store program instructions and/or information (e.g., data) associated with modules 126-128. Storage components 148 may include a memory configured to store data or other information associated with modules 126-128.

One or more processors 140 may implement functionality and/or execute instructions associated with host computing device 102. Examples of processors 140 include application processors, display controllers, auxiliary processors, one or more sensor hubs, and any other hardware configure to function as a processor, a processing unit, or a processing device. Modules 126-128 may be operable (or, in other words, executed) by processors 140 to perform various actions, operations, or functions of host computing device 102. That is, modules 126-128 may form executable bytecode, which when executed, cause processors 140 to perform specific operations (and thereby causing host computing device 102 to become a specific-purpose computer by which to perform) in accordance with various aspects of the techniques described herein. For example, processors 140 of host computing device 102 may retrieve and execute instructions stored by storage components 148 that cause processors 140 to perform the operations described herein that are attributed to modules 126-128. The instructions, when executed by processors 140, may cause host computing device 102 to store information within storage components 148.

Client computing device 202 may include components similar to host computing device 102. As further shown in the example of FIG. 1, client computing device 202 may include one or more processors 240, one or more communication units 242, one or more input components 244, one or more output components 246, and one or more storage devices 284. Each of components 212-284 may be similar to, if not substantially similar to, respective components 112-184, as described above. Client computing device 202 also includes communication channels 250 interconnecting modules 240-284. Communication channels 250 may be similar to, if not substantially similar to, communication channels 150 discussed in more detail above. Furthermore, storage devices 284 may store an OS 226 and an OS projection app 228, which may be similar to, if not substantially similar to, respective OS 126 and OS projection app 128.

Host computing device 102 may be integrated or otherwise included within a vehicle. The vehicle may include one or more of a bicycle, a tricycle, a unicycle, an automobile, farm equipment (such as a tractor, combine, etc.), construction equipment (a dump truck, crane, etc.), military vehicle or equipment (a tank, armament, etc.), a truck, a semi-tractor (or, in other words, a semi-trailer), aviation equipment (such as a plane), nautical equipment (such as a boat, carrier, etc.), or any other type of vehicle.

In this respect, host computing device 102 may represent a vehicle head unit that is integrated into a dashboard or other component of the vehicle, where host computing device 102 may be referred to alternatively as vehicle head unit 102, host vehicle head unit 102, and/or main computing device 102. In this context, processors 140 may retrieve and execute OS 126, which may be referred to as an embedded OS in that OS 126 is a fully specified OS that provides a full-featured application execution environment in which local applications (so-called "apps," which are not shown for ease of illustration) may be stored locally (e.g., to storage devices 184) and executed by processors 140 within the execution environment provided by OS 126.

OS 126 may, in this context, include a kernel that supports interaction between the applications and underlying hardware, such as processors 140, communication units 142, input components 144, output components 146, presence-sensitive display 112, and/or storage devices 184. The kernel may execute in so-called kernel space (which refers to a privileged OS-level execution environment) that is separate from a so-called user space that supports the application environment in which the applications execute. The kernel may expose an interface (such as an application programming interface—API) by which the user space (and applications executing therein) may access kernel space in a limited manner (e.g., having less privileges than the kernel) in order to interface with the underlying hardware.

OS 126, in other words, does not represent a thin client that supports projection, casting, or other processes by which to mirror output from an OS executed by a separate device, such as OS 226 executed by separate client computing device 202. OS 126 instead provides, as noted above, a full execution environment that is separate from OS 226 executed by client computing device 202 (or any other separate device) that facilitate local (e.g., on host computing device 102) execution of applications, rather than stream applications within OS 226 during execution by client computing device 202.

In this context of embedded OS 126 (which is another way to refer to OS 126), OS 126 may enable PAN links between host computing device 102 and client computing device 202 (or any other client computing device that supports PAN links for wireless communication between host computing device 102 and such client computing devices). OS 126 implements a PAN stack as a native function of OS 126 (meaning, within kernel space), thereby allowing OS 126 (and/or one or more applications executing within the user space) to establish PAN links with external devices, such as client computing device 202 (and potentially via the kernel API for applications executed locally by OS 126).

To establish a PAN link, OS 126 invokes the PAN stack, which includes a discovery process by which PAN stack configures communication units 142 to accept incoming connection requests. An operator of the vehicle may interface, e.g., via presence-sensitive display 112, with OS 126 to initiate the discovery process in which the PAN stack configures communication unit 142 (which again may implement a PAN interface, and therefore be referred to as PAN interface 142) to accept incoming connection requests.

The operator of the vehicle may next interface with client computing device 202, e.g., via presence-sensitive display 212, to have OS 226 invoke a similar PAN stack in order to configure communication unit 242 (which again may represent a PAN interface, and as such may be referred to as PAN interface 242) to initiate a pairing process that transmits the connection request in order to bond (or, in other words, pair) client computing device 202 to host computing device 102). The operator may next confirm that pairing should occur (generally, via a selection of a user interface element presented via presence-sensitive display 112 and/or presence-sensitive display 212). Pairing of client computing device 202 (or more specifically, PAN interface 242) and host computing device 102 (or more specifically, PAN interface 142) may include exchange of security keys that are used for encrypting or otherwise securing communications via the PAN link to be established between PAN interface 142 and PAN interface 242.

Pairing in this manner results in a semi-permanent bond between PAN interface 142 and PAN interface 242, meaning that client computing device 202 is paired to host computing device 102 until the pairing is explicitly, with user authorization, removed, either via host computing device 102 or client computing device 202. This pairing may also be user account agnostic, where other user accounts may identify this pairing as having occurred even though such user accounts are not associated with client computing device 202.

OS 126 may support pairing to establish the PAN link for a number of different purposes. For example, OS 126 may support pairing to enable host computing device 102 to act as a conduit for cellular voice calls originated by client computing device 202, streaming of music and other audio originated by client computing device 202, and the like. However, the PAN link may not be suitable for various more data intensive use cases, such as display of video data, projection of an operating system, and the like, as PAN links are typically low bandwidth connections so as to avoid consuming power (which may be helpful for power restricted devices, such as smartphones, laptop computers, tablet computers, smartwatches, smartglasses or any other computing device that relies on a battery or other limited power source).

In the context of projecting an operating system, OS 126 may support execution of OS projection app 128. OS projection app 128 may represent an application that facilitates display and interaction with an operating system projected by another computing device, such as client computing device 202, via host computing device 102. OS projection app 128 may establish a projection session over which to receive the projected OS (as a sequence of one or more frames of video data) and return interactions with the projected OS back to the computing device providing the projected OS.

In order to establish the projection session, OS projection app 128 may prompt the operator of host computing device 102 to first establish the PAN connection between host computing device 102 and client computing device 202 for low bandwidth communication between host computing device 102 and client computing device 202. The PAN connection may allow client computing device 202 to authenticate with host computing device 102 through exchange of the above noted security keys and thereby establish that client computing device 202 is authorized to communicate with host computing device 102. As the PAN connection is local (e.g., within 30 feet), the PAN connection may also ensure that client computing device 202 is local to host computing device 102 as well.

After establishing the PAN connection, OS projection app 128 may prompt the occupant of the vehicle to establish a high bandwidth wireless local area network (WLAN) connection between host computing device 102 and client computing device 202. OS 126 may further natively support a WLAN stack by which to configure communication unit 142 to operate as a WLAN interface (and as such may also be referred to as WLAN interface 142). WLAN interface 142 may broadcast a service set identifier (SSID) that identifies a name of the WLAN provided by host computing device 102.

OS 226 of client computing device 102 may also natively support a WLAN stack by which to configure communication unit 242 to operate as a WLAN interface (where again communication unit 242 may be referred to as WLAN interface 242). The occupant of the vehicle may interface with client computing device 202 to initiate the WLAN connection between WLAN interface 242 and WLAN interface 142 of host computing device 102. This WLAN connection may have significantly more bandwidth compared to the previously established PAN connection (e.g., 11 megabits per second—Mbps—versus 800 kilobits per second—Kbps—for the PAN connection).

After configuring one or more of the PAN connection and the WLAN connection, the occupant may interface with either or both of OS projection app 128 and OS projection app 228 to initiate the projection session between OS projection app 128 and OS projection app 228. OS projection app 228, like OS projection app 128, may represent an application configure to facilitate the wireless projection of OS 226 to host computing device 102 for display via presence-sensitive display 112. OS projection app 228 may provide video data representative of OS 226 via the projection session, which OS projection app 128 receives and provides via OS 126 to presence-sensitive display 112 for display to the occupant.

Often OS 126 is outdated and difficult to update, especially given that host computing device 102 may also have outdated hardware that is also difficult and/or expensive to update (as host computing device 102 may be integrated into the dashboard or other portion of the vehicle). Projection of OS 226 via the projection session established between OS projection app 128 and OS projection app 228 may allow for a more modern experience for the occupant given that OS 226 may be in constant development, updated on a more regular basis, provide cellular data at no additional expense to the occupant, provide updated applications (such as navigation applications that are largely up-to-date in terms of roads, traffic, etc.), and the like. Moreover, client computing device 202 may provide for more updated hardware that better accommodates computationally demanding applications and use cases that the outdated hardware of host computing device 102 may be unable to execute well.

While projection of OS 226 may provide for a better user experience, it may be difficult for the occupant to successfully navigate the process of establish the PAN connection and the WLAN connection in order to configure the projection session between OS projection app 128 and OS projection app 228. That is, OS 126 may not fully implement the PAN stack or may have one or more issues that impact the stability of the PAN stack, while OS 226 may provide an updated PAN stack that is incompatible with the implementation of the PAN stack by OS 126. Even with well implemented PAN stacks, there may be differences in how the PAN stacks of OS 126 and OS 226 are implemented, leaving the user experience difficult for the occupant to navigate and thereby potentially significantly detracting from the ability to project OS 226.

In accordance with various aspects of the techniques set forth in this disclosure, host computing device 102 may facilitate automated wireless (e.g., WLAN) connections for operating system projection in vehicles. Rather than establish a PAN connection that may be prone to connection issues, user error, signal degradation, incompatible PAN implementations, etc., various aspects of the techniques enable host computing device 102 to perform a wireless inter-device communication process to provide connection information identifying the WLAN network hosted by host computing device 102. The wireless inter-device communication process may include presentation of a quick response (QR) code that provides the connection information, allowing client computing device 202 (or another occupant device) to capture an image of the QR code and thereby automatically establish the WLAN connection with host computing device 102 via WLAN hosted by host computing device 102. After establishing the WLAN connection, client computing device 102 may then project OS 226 to host computing device 102 for display via presence-sensitive display 112.

In operation, client computing device 202 may receive, from host computing device 102, and via a wireless inter-device communication process, the connection information identifying a WLAN provided host computing device 102. The connection information may include the SSID of the WLAN and authentication information (such as a password) for establish the WLAN connection. Such connection information for example can be embedded in a quick response (QR) code.

In the example of FIG. 1, OS projection app 128 may, once invoked by the occupant via OS 126, present a QR code 130 via presence-sensitive display 112. As such, the wireless inter-device communication process may include presentation of QR code 130 via presence-sensitive display 112. To receive the connection information, client computing device 202 may invoke OS projection app 228 or some other app (e.g., a QR code reader app, a camera app, etc.) capable of capturing an image of QR code 130. Regardless of how QR code 130 is captured, OS projection app 228 may decode QR code 130 to receive the connection information.

While described with respect to QR code 130, any other type of visual representation of connection information may be displayed and thereafter captured, including a barcode, a graphic, an image, etc. Moreover, while described with respect to visual representations of connection information, the wireless inter-device communication process may include a near field communication (NFC) communication session, an ultrawideband (UWB) communication session, or any other local (e.g., within 30 or less feet) wireless communication process by which to receive the connection information. The wireless inter-device communication process may remain local so as to ensure that unauthorized, nearby persons are not able to automatically access the WLAN via the inter-device communication process.

In any event, OS projection app 228 may automatically establish, based on the connection information, the WLAN connection to the WLAN provided by host computing device 102. In some instances, the connection information provided by QR code 130 may include an Internet protocol (IP) address and a port associated with a server (e.g., implemented at least in part by OS projection app 128) that hosts the above noted projection session. In this instance, OS projection app 228 may also establish, via the WLAN connection and based on the IP address and the port associated with the server, the projection session with the server (which again may be implemented at least in part by OS projection app 128) over the WLAN connection.

OS projection app 228 may project, via the projection session (established over the WLAN connection), OS 226 (which may be formatted differently to accommodate various regulations for display of OS 226 via presence-sensitive display 112) to host computing device 102 for display by presence-sensitive display 112. Once OS 226 is projected and displayed by presence-sensitive display 112, the occupant may interface with OS 226 to launch apps, receive notifications, respond to notification (e.g., via a voice command), etc. OS projection app 128 may receive these interactions and provide such interaction via the projection session to OS projection app 228. OS projection app 228 may, based on these interactions, adapt OS 226, thereby updating OS 226 to reflect the various interactions. OS projection app 228 may project updated OS 226 back to OS projection app 128 (via the projection session) for display via presence-sensitive display 112. OS projection app 128 and OS projection app 228 may operate in this manner to facilitate projection of OS 226.

As such, various aspects of the techniques may enable client computing device 202 to automatically establish the WLAN connection with host computing device 102 for purposes of projecting OS 226 without having to resort to complicated pairing processes involved in establishing the PAN connection. That is, client computing device 202 may refrain from establishing the PAN connection with host computing device 102 prior to receiving the connection information used to automatically establish the WLAN connection. As establishing the PAN connection may involve multiple different steps that are susceptible to user error, connection issues (due to, as one example, interference), faulty or incompatible implementations, and the like, avoiding having to establish this PAN connection may significantly improve the user experience involved in wireless projection of OS 226.

Moreover, repeated attempts to establish the PAN connection may consume significant computing resources of client computing device 202, such as processor cycles, memory storage space, memory bus bandwidth, and/or power associated with operating the processor, memory, memory bus, and wireless radios. By avoiding or refraining from establishing the PAN connection in favor of a more straightforward QR code 130 to establish the potentially better, more established WLAN connection (e.g., an Institute of Electrical and Electronics Engineers—IEEE-802.11 compliant WLAN standard), operation of client computing device 202 may itself improve through more efficient operation.

Figure 2:
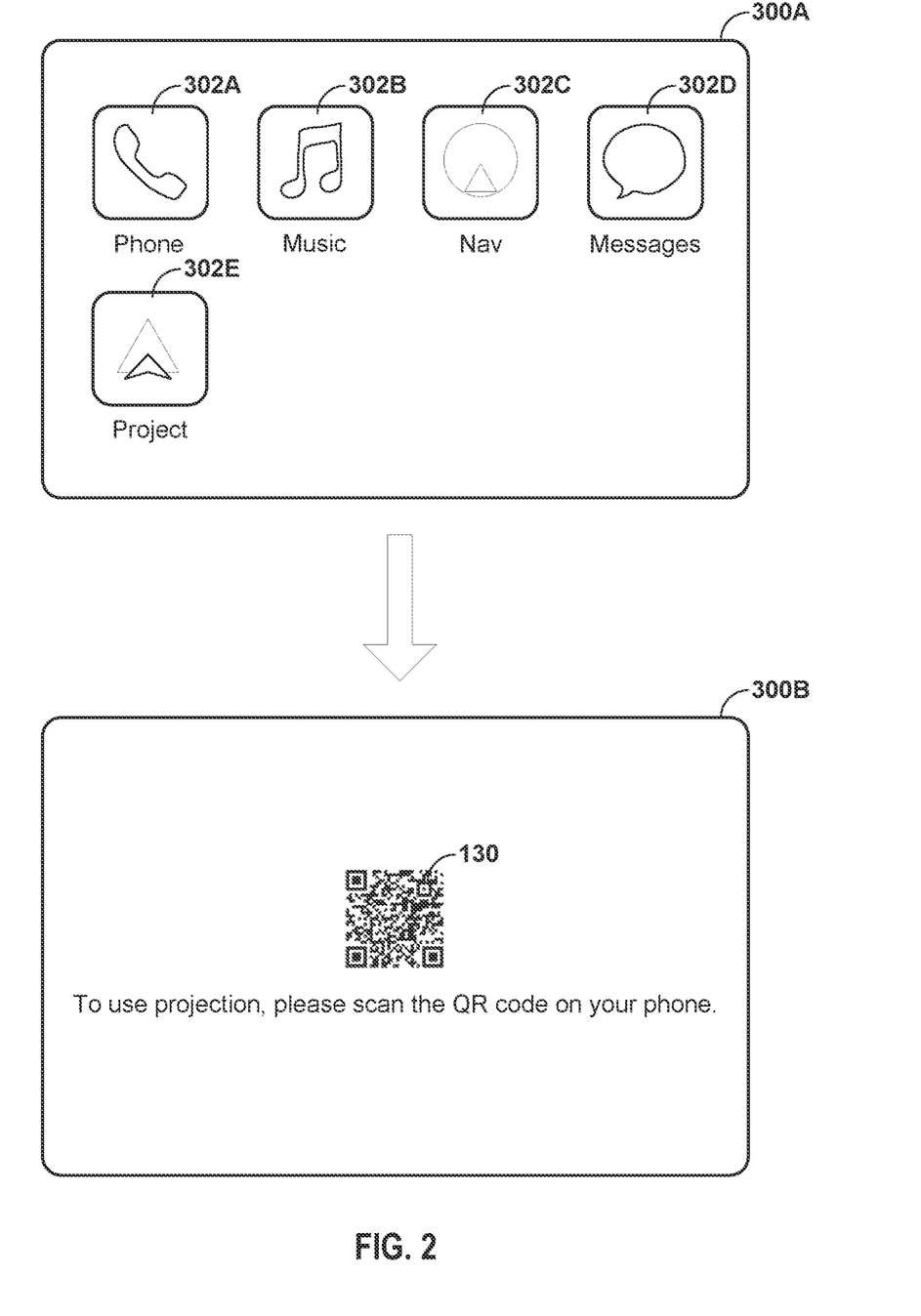
FIG. 2 is a diagram illustrating example operation of the host computing device of FIG. 1 in performing various aspects of the automated wireless connection techniques described in this disclosure.

FIG. 2 is a diagram illustrating example operation of the host computing device of FIG. 1 in performing various aspects of the automated wireless connection techniques described in this disclosure. In particular, FIG. 2 depicts a user interface 300A presented by presence-sensitive display 112 of host computing device 102.

As shown in the example of FIG. 2, user interface 300A may include a number of application icons 302A-302E. Application icon 302A represents a phone application by which the occupant may place cellular phone calls. Application icon 302B represents a music application by which the occupant may play music via the vehicle sound system. Application icon 302C represents a navigation ("Nav") application by which the occupant may select a destination and receive directions to the destination from the current location of the vehicle. Application icon 302D represents a messages application by which the occupant may review and possibly send messages, such as text messages. Application icon 302E represents OS projection app 128 by which to project OS 226 to host computing device 102.

As shown in the example of FIG. 2, application icon 302E is not disabled or otherwise grayed out even though it is assumed that no client computing device, such as client computing device 202, is currently connected to host computing device 102. In other words, rather than require client computing device 202 to be connected via both the PAN connection and the WLAN connection prior to enabling application icon 302E, user interface 300A presents application icon 302E as enabled and active given that the PAN connection is no longer required prior to automatically establishing the WLAN connection.

Instead, when the occupant selects application icon 302E, OS 126 may invoke OS projection app 128, which transitions to user interface 300B. As further shown in the example of FIG. 2, user interface 300B presents QR code 130 that includes the connection information. The occupant may then interface with client computing device 202 to scan the code (possibly by loading OS projection app 228, which may perform the scan of QR code 130, thereby receiving the connection information embedded in QR code 130). As noted above, the connection information may also include information (e.g., the IP address and port of the server) used for establishing the projection session. Moreover, the connection information may provide information necessary to automatically establish other connections, such as the PAN connection.

In this way, the occupant may avoid the complicated process of pairing client computing device 202 to host computing device 102 to form the PAN connection, which may involve navigating the user interface presented by OS 126 of host computing device 102 to identify a device manager, and then following the instructions presented by the device manager to establish the PAN connection between client computing device 202 and host computing device 102. This pairing process may also involve navigating the user interface presented by OS 226 of client computing device 202 in order to establish the PAN connection with host computing device 102. The occupant may then additionally have to return back to OS projection app 128 in order to begin wirelessly projecting OS 226 via OS projection app 228 to OS projection app 128 of host computing device.

All of these additional steps may detract from the occupant paying attention to the surroundings while potentially operating the vehicle, resulting in distractions that may present significant safety hazards to both the occupant and any people and/or other vehicles nearby. In this respect, various aspects of the techniques reduce distractions by seamlessly automating the connections between host computing device 102 and client computing device 202, where the occupant need only select application icon 302E and then interface with client computing device 202 to scan QR code 130 prior to wireless OS projection beginning. As a result, not only do various aspects of the techniques described in this disclosure facilitate more efficient operation of both host computing device 102 and client computing device 202, but the techniques may reduce distractions and thereby promote safer operation of the vehicle.

Figure 3:
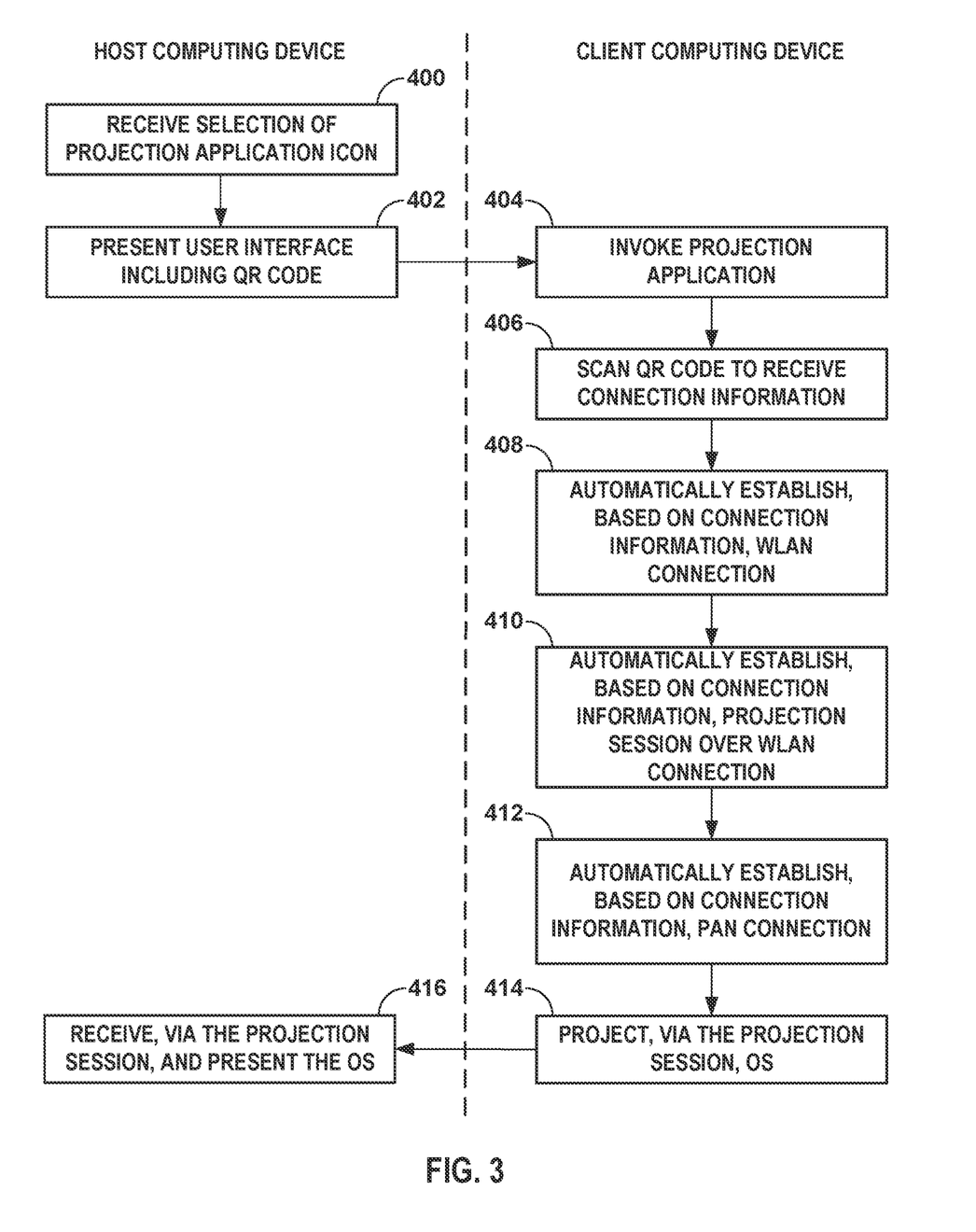
FIG. 3 is a flowchart illustrating example operation of the system shown in the example of FIG. 1 in performing various aspects of the automated wireless connection techniques described in this disclosure.

FIG. 3 is a flowchart illustrating example operation of the system shown in the example of FIG. 1 in performing various aspects of the automated wireless connection techniques described in this disclosure. As described above, host computing device 102 may facilitate automated wireless (e.g., WLAN) connections for operating system projection in vehicles. Rather than establish a PAN connection that may be prone to connection issues, user error, signal degradation, incompatible PAN implementations, etc., various aspects of the techniques enable host computing device 102 to perform a wireless inter-device communication process to provide connection information identifying the WLAN network hosted by host computing device 102.

As described above with respect to the example of FIG. 2, OS 126 of host computing device 102 may present a user interface 300A that includes application icon 302E representative of OS projection app 128 (where such application icon 302E may be denoted as "projection application icon 302E") (400). OS 126 may receive a selection (by the occupant of the vehicle) of projection application icon 302E, which causes OS 126 to invoke OS projection app 128. OS projection app 128 may present, via presence-sensitive display 112, user interface 300B that includes QR code 130 (402).

The occupant may then interface with client computing device 202 to invoke OS projection app 228 (404), which may be configured to scan QR code 130 to receive the above noted connection information (406). As noted above, computing device 202 may invoke different applications to scan QR code 130, such as a dedicated QR code application, a camera application, etc. In this respect, client computing device 202 may receive, from host computing device 102, and via a wireless inter-device communication process (i.e., the QR code scanning process in this example), the connection information identifying a WLAN provided host computing device 102. The connection information may include the SSID of the WLAN and authentication information (such as a password) for establish the WLAN connection. Such connection information for example can be embedded in a quick response (QR) code.

In any event, OS projection app 228 may automatically establish, based on the connection information, the WLAN connection to the WLAN provided by host computing device 102 (408). In some instances, the connection information provided by QR code 130 may include an Internet protocol (IP) address and a port associated with a server (e.g., implemented at least in part by OS projection app 128) that hosts the above noted projection session. In this instance, OS projection app 228 may also automatically establish, via the WLAN connection and based on the IP address and the port associated with the server, the projection session with the server (which again may be implemented at least in part by OS projection app 128) over the WLAN connection (410).

OS projection app 228 may also automatically establish, based on the connection information, a PAN connection (which may be used for the hands-free profile—HFP) (412). That is, the connection information may include a PAN media access control (MAC) address identifying the vehicle head unit. OS projection app 228 may configure communication units 242 to act as a PAN interface by which to establish, based on the PAN MAC address identifying vehicle head unit 102, the PAN connection between client computing device 202 and vehicle head unit 102.

OS projection app 228 may project, via the projection session (established over the WLAN connection), OS 226 (which may be formatted differently to accommodate various regulations for display of OS 226 via presence-sensitive display 112 and as such may represent a vehicle operating system) to host computing device 102 for display by presence-sensitive display 112 (414). OS projection app 128 may receive, via the projection session, and present OS 226 via presence-sensitive display 112 (416).

In this way, various aspects of the techniques described in this disclosure may enable the following examples.

Example 1. 1. A method comprising: receiving, by a computing device, from a vehicle head unit, and via a wireless inter-device communication process, connection information identifying a wireless network provided by the vehicle head unit; automatically establishing, by the computing device, and based on the connection information, a wireless network connection to the wireless network provided by the vehicle head unit; and projecting, by the computing device, and via the wireless network connection, a vehicle operating system to the vehicle head unit for display by the vehicle head unit.

Example 2. The method of example 1, wherein receiving the connection information comprises capturing, by the computing device, an image of a quick response code displayed by the vehicle head unit, the quick response code including the connection information.

Example 3. The method of example 1, wherein receiving the connection information comprises receiving, by the computing device, from the vehicle head unit, and via a near field communication session, the connection information.

Example 4. The method of example 1, wherein receiving the connection information comprises receiving, by the computing device, from the vehicle head unit, and via an ultra-wideband communication session, the connection information.

Example 5. The method of any combination of examples 1-4, wherein receiving the connection information comprises refraining, by the computing device, from establishing a personal area network connection with the vehicle head unit prior to receiving the connection information.

Example 6. The method of any combination of examples 1-5, wherein the connection information includes a service set identifier identifying the wireless network and authentication information for establishing the wireless network connection.

Example 7. The method of example 6, wherein the connection information also includes an Internet protocol address and a port associated with a server presented by the vehicle head unit to accept the vehicle operating system projected by the computing device.

Example 8. The method of example 7, wherein projecting the vehicle operating system comprises: establishing, via the wireless network connection, and based on the Internet protocol address and the port associated with the server, a projection session with the server presented by the vehicle over the wireless network connection; and projecting, by the computing device, and via the projection session with the server established over the wireless network connection, the vehicle operating system to the vehicle head unit for display by the vehicle head unit.

Example 9. The method of any combination of examples 1-8, wherein projecting the vehicle operating system comprises executing, by the computing device, a projection application that projects, via the wireless network connection, the vehicle operating system to the vehicle head unit for display by the vehicle head unit.

Example 10. The method of example 9, wherein receiving the connection information comprises capturing, by a projection application executed by the computing device, an image of a quick response code displayed by the vehicle head unit, the quick response code including the connection information.

Example 11. A computing device comprising: one or more processors configured to receive, from a vehicle head unit, and via a wireless inter-device communication process, connection information identifying a wireless network provided by the vehicle head unit; a network interface configured to automatically establish, based on the connection information, a wireless network connection to the wireless network provided by the vehicle head unit, wherein the one or more processors are configured to project, via the wireless network connection, a vehicle operating system to the vehicle head unit for display by the vehicle head unit; and a memory configured to store the connection information.

Example 12. The computing device of example 11, wherein the one or more processors are, when configured to receive the connection information, configured to capture an image of a quick response code displayed by the vehicle head unit, the quick response code including the connection information.

Example 13. The computing device of example 11, wherein the one or more processors are, when configured to receive the connection information, configured to receive, from the vehicle head unit, and via a near field communication session, the connection information.

Example 14. The computing device of example 11, wherein the one or more processors are, when configured to receive the connection information, configured to receive, from the vehicle head unit, and via an ultra-wideband communication session, the connection information.

Example 15. The computing device of any combination of examples 11-14, wherein the one or more processors are, when configured to receive the connection information, configured to refrain from establishing a personal area network connection with the vehicle head unit prior to receiving the connection information.

Example 16. The computing device of any combination of examples 11-15, wherein the connection information includes a service set identifier identifying the wireless network and authentication information for establishing the wireless network connection.

Example 17. The computing device of example 16, wherein the connection information also includes an Internet protocol address and a port associated with a server presented by the vehicle head unit to accept the vehicle operating system projected by the computing device.

Example 18. The computing device of example 17, wherein the one or more processors are, when configured to project the vehicle operating system, configured to: establish, via the wireless network connection, and based on the Internet protocol address and the port associated with the server, a projection session with the server presented by the vehicle over the wireless network connection; and project, via the projection session with the server established over the wireless network connection, the vehicle operating system to the vehicle head unit for display by the vehicle head unit.

Example 19. The computing device of any combination of examples 11-18, wherein the one or more processors are, when configured to project the vehicle operating system, configured to execute a projection application that projects, via the wireless network connection, the vehicle operating system to the vehicle head unit for display by the vehicle head unit.

Example 20. A non-transitory computer-readable storage medium having instructions stored thereon that, when executed, cause one or more processors to: receive, from a vehicle head unit, and via a wireless inter-device communication process, connection information identifying a wireless network provided by the vehicle head unit; automatically establish, based on the connection information, a wireless network connection to the wireless network provided by the vehicle head unit; and project, via the wireless network connection, a vehicle operating system to the vehicle head unit for display by the vehicle head unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, ultra Blu-ray, etc. where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
  receiving, by a computing device, from a vehicle head unit, and via a wireless inter-device communication process, connection information identifying a wireless network provided by the vehicle head unit;
  automatically establishing, by the computing device, and based on the connection information, a wireless network connection to the wireless network provided by the vehicle head unit; and
  projecting, by the computing device, and via the wireless network connection, a vehicle operating system executed by the computing device to a local embedded vehicle operating system executed by the vehicle head unit for display by the vehicle head unit, the local embedded vehicle operating system providing a full execution environment that is separate from the vehicle operating system for local execution of applications.

2. The method of claim 1, wherein receiving the connection information comprises capturing, by the computing device, an image of a quick response code displayed by the vehicle head unit, the quick response code including the connection information.

3. The method of claim 1, wherein receiving the connection information comprises receiving, by the computing device, from the vehicle head unit, and via a near field communication session, the connection information.

4. The method of claim 1, wherein receiving the connection information comprises receiving, by the computing device, from the vehicle head unit, and via an ultra-wideband communication session, the connection information.

5. The method of claim 1, wherein receiving the connection information comprises refraining, by the computing device, from establishing a personal area network connection with the vehicle head unit prior to receiving the connection information.

6. The method of claim 1, wherein the connection information includes a service set identifier identifying the wireless network and authentication information for establishing the wireless network connection.

7. The method of claim 6, wherein the connection information also includes:
- an Internet protocol address and a port associated with a server presented by the vehicle head unit to accept the vehicle operating system projected by the computing device; and
- a personal area network media access control address for the vehicle head unit used for establishing a personal area network connection with the vehicle.

8. The method of claim 7, wherein projecting the vehicle operating system comprises:
- establishing, via the wireless network connection, and based on the Internet protocol address and the port associated with the server, a projection session with the server presented by the vehicle over the wireless network connection; and
- projecting, by the computing device, and via the projection session with the server established over the wireless network connection, the vehicle operating system to the vehicle head unit for display by the vehicle head unit.

9. The method of claim 1, wherein projecting the vehicle operating system comprises executing, by the computing device, a projection application that projects, via the wireless network connection, the vehicle operating system to the vehicle head unit for display by the vehicle head unit.

10. The method of claim 9, wherein receiving the connection information comprises capturing, by a projection application executed by the computing device, an image of a quick response code displayed by the vehicle head unit, the quick response code including the connection information.

11. A computing device comprising:
- one or more processors configured to receive, from a vehicle head unit, and via a wireless inter-device communication process, connection information identifying a wireless network provided by the vehicle head unit;
- a network interface configured to automatically establish, based on the connection information, a wireless network connection to the wireless network provided by the vehicle head unit,
- wherein the one or more processors are configured to project, via the wireless network connection, a vehicle operating system executed by the one or more processors to a local embedded vehicle operating system executed by the vehicle head unit for display by the vehicle head unit, the local embedded vehicle operating system providing a full execution environment that is separate from the vehicle operating system for local execution of applications; and
- a memory configured to store the connection information.

12. The computing device of claim 11, wherein the one or more processors are, when configured to receive the connection information, configured to capture an image of a quick response code displayed by the vehicle head unit, the quick response code including the connection information.

13. The computing device of claim 11, wherein the one or more processors are, when configured to receive the connection information, configured to receive, from the vehicle head unit, and via a near field communication session, the connection information.

14. The computing device of claim 11, wherein the one or more processors are, when configured to receive the connection information, configured to receive, from the vehicle head unit, and via an ultra-wideband communication session, the connection information.

15. The computing device of claim 11, wherein the one or more processors are, when configured to receive the connection information, configured to refrain from establishing a personal area network connection with the vehicle head unit prior to receiving the connection information.

16. The computing device of claim 11, wherein the connection information includes a service set identifier identifying the wireless network and authentication information for establishing the wireless network connection.

17. The computing device of claim 16, wherein the connection information also includes an Internet protocol address and a port associated with a server presented by the vehicle head unit to accept the vehicle operating system projected by the computing device.

18. The computing device of claim 17, wherein the one or more processors are, when configured to project the vehicle operating system, configured to:
- establish, via the wireless network connection, and based on the Internet protocol address and the port associated with the server, a projection session with the server presented by the vehicle over the wireless network connection; and
- project, via the projection session with the server established over the wireless network connection, the vehicle operating system to the vehicle head unit for display by the vehicle head unit.

19. The computing device of claim 11, wherein the one or more processors are, when configured to project the vehicle operating system, configured to execute a projection application that projects, via the wireless network connection, the vehicle operating system to the vehicle head unit for display by the vehicle head unit.

20. A non-transitory computer-readable storage medium having instructions stored thereon that, when executed, cause one or more processors of a computing device to:
- receive, from a vehicle head unit, and via a wireless inter-device communication process, connection information identifying a wireless network provided by the vehicle head unit;
- automatically establish, based on the connection information, a wireless network connection to the wireless network provided by the vehicle head unit; and
- project, via the wireless network connection, a vehicle operating system executed by the computing device to a local embedded vehicle operating system executed by the vehicle head unit for display by the vehicle head unit, the local embedded vehicle operating system providing a full execution environment that is separate from the vehicle operating system for local execution of applications.

* * * * *